United States Patent [19]

Timmann

[11] Patent Number: 4,822,573
[45] Date of Patent: Apr. 18, 1989

[54] FLUIDIZED-BED REACTOR

[75] Inventor: Hinrich Timmann, Hamburg, Fed. Rep. of Germany

[73] Assignee: Brown, Boveri & Cie AG, Mannheim, Fed. Rep. of Germany

[21] Appl. No.: 33,392

[22] Filed: Mar. 2, 1987

[30] Foreign Application Priority Data

Jul. 2, 1985 [DE] Fed. Rep. of Germany ....... 3523653

[51] Int. Cl.$^4$ ............................................. F27B 15/10
[52] U.S. Cl. ................................... 422/143; 422/146; 202/31; 34/57 A
[58] Field of Search .................. 422/143, 146; 201/29, 201/31; 34/57 A, 57 B; 55/474

[56] References Cited

U.S. PATENT DOCUMENTS

| | | | |
|---|---|---|---|
| 2,798,030 | 7/1957 | Hettick et al. | 34/57 A |
| 3,040,438 | 6/1962 | Perlman et al. | 34/57 A |
| 4,105,419 | 8/1978 | Highley et al. | 201/31 |
| 4,203,804 | 5/1980 | Janning et al. | 34/57 A |
| 4,241,021 | 12/1980 | Skrzec | 422/143 |
| 4,489,504 | 12/1984 | Hammer | 34/57 A |
| 4,673,552 | 6/1987 | Li et al. | 422/143 |
| 4,702,891 | 10/1987 | Li et al. | 422/143 |

FOREIGN PATENT DOCUMENTS 2150040 6/1985 United Kingdom .

Primary Examiner—Benoit Castel
Attorney, Agent, or Firm—Herbert L. Lerner; Laurence A. Greenberg

[57] ABSTRACT

A fluidized-bed reactor for the pyrolytic treatment of wastes containing hydrocarbons and a high content of polymeric organic substances includes a circumferential wall having an inner surface and an interior with a conical lower section and an expanded cylindrical upper section. Fluidizing-gas feed pipes have ends with lower circumferential sections protruding directly from the inner surface of the circumferential wall into the conical lower section. Covering walls covering the ends of the fluidizing-gas feed pipes and extend obliquely downwardly and inwardly. Blow orifices are each disposed at a respective one of the lower circumferential sections and have an obliquely downward and inward blow direction for blowing fluidizing-gas into a fluidized-bed material in the interior. Heating pipes for heating with heating gas dip vertically from above through the expanded cylindrical upper section of the interior. The heating pipes have connections for heating gas, combustion air and exhaust gas.

9 Claims, 2 Drawing Sheets

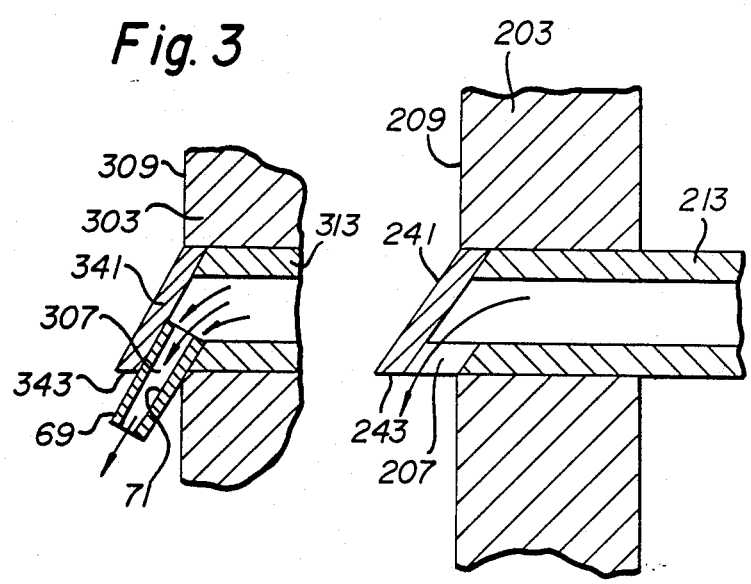
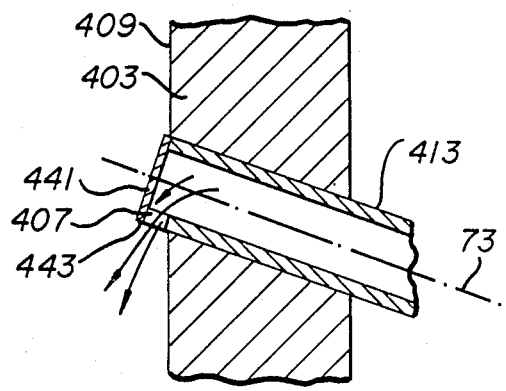

FLUIDIZED-BED REACTOR

CROSS-REFERENCE TO RELATED APPLICATION

This application is a continuation of copending PCT/DE86/00263, filed June 26, 1986.

BACKGROUND OF THE INVENTION

The invention relates to a fluidized-bed reactor, in particular a reactor with indirect heating, preferably for the pyrolytic treatment of a starting material, especially hydrocarboncontaining wastes with a high content of polymeric organic substances, such as scrap rubber, old tires and/or plastic wastes, including a reactor vessel having a substantially vertical circumferential wall defining an interior of the vessel preferably having a circular cross-section and having an array of fluidizing-gas blow orifices for blowing a fluidizing gas into a fluidized-bed material, the fluidizing gas preferably being formed at least partially of pyrolysis gas produced during pyrolysis, the fluidized-bed material preferably being selected from the group consisting of sand, alumina, coke, soot and the like, the blow orifices defining a downward-pointing blowing direction and preferably being provided on inner ends of fluidizing-gas feed pipes.

For many applications in fluidized-bed reactors, in particular in the pyrolytic treatment of wastes having a high hydrocarbon content, such as scrap rubber or plastic wastes, the technique described in German Patent No. DE-PS 26 58 371, which has a downward-pointing blowing-in direction of the fluidizing gas, has proven very suitable. In order to blow in gas, fluidizing-gas feed pipes were used which extend into the part of the interior of the reactor intended for forming the fluidized bed, preferably in such a way that the feed pipes end in end sections which are bent off downwards. In operation, these devices which serve to introduce the fluidizing gas from above divided the fluidized bed into individual free partial cross-sections, each of which only took up a small fraction of the total free cross-sectional area of the fluidized-bed region. This caused difficulties in the processing of starting material which contained relatively large, non-pyrolyzable constituents, for example wire inserts of car tires. Moreover, the feed pipes located in the fluidized bed made it difficult to generate a rotary motion of the fluidized bed which is advantageous for many applications, and generally made it difficult to establish uniform flow conditions in the fluidized bed across the entire cross-section of the interior of the reactor.

SUMMARY OF THE INVENTION

It is accordingly an object of the invention to provide a fluidized-bed reactor which is operated with an advantageous introduction of the fluidizing gas from above, which facilitates the processing of relatively large, non-pyrolyzable residual constituents of the starting material and which promotes the establishment of uniform flow conditions in the fluidized bed.

With the objects of the invention in view, there is provided a fluidized-bed reactor, in particular a reactor with indirect heating, preferably for the pyrolytic treatment of a starting material, especially hydrocarbon-containing wastes with a high content of polymeric organic substances, such as scrap rubber, old tires and/or plastic wastes, including a reactor vessel having a substantially vertical circumferential wall defining an interior of the vessel preferably having a circular cross-section and having an array of fluidizing-gas blow orifices for blowing a fluidizing gas into a fluidized-bed material, the fluidizing gas preferably being formed at least partially of pyrolysis gas produced during pyrolysis, the fluidized-bed material preferably being selected from the group consisting of sand, alumina, coke, soot and the like, the blow orifices defining a downward-pointing blowing direction and preferably being provided on inner ends of fluidizing-gas feed pipes, the blow orifices being disposed close to the inside of the circumferential wall and defining obliquely downwardly and inwardly-pointing blowing directions.

In the fluidized-bed reactor according to the invention, the blow orifices located close to the inside of the circumferential wall do not represent an interfering restriction of the interior cross-section available for forming the fluidized bed, so that even relatively large, non-pyrolyzable pieces can pass through the space between the blow orifices. As a result, such pieces can be more reliably removed from the fluidized bed, and it becomes feasible to run the reactor with a continuous downward flow and thus to obtain a higher throughput at a given size. Moreover, damage to the blow orifices is less likely, and the fluidized bed can form evenly across the entire free cross-section of the interior of the reactor. This also permits an increase in throughput.

When testing the invention in practice, it has been found that with the blow orifices mounted close to the inside of the circumferential wall and defining obliquely downwardly and inwardly-pointing blowing directions according to the invention, a high-performance fluidized bed can be generated in the same way as with blow orifices which are distributed over the entire cross-section of the fluidized-bed region. This surprising and advantageous effect can be even further improved and made less susceptible to disturbances if, in accordance with another feature of the invention, blow orifices are mounted in a downward-extending inclined section on the inside of the reactor inner wall. Preferably, the inclined section in this case is a substantially conical lower section of the inner wall, so that the desired rotational symmetry relative to a vertical axis of the reactor is obtained. Through the use of this embodiment, a vigorous upward flow of the fluidizing gas, which is sufficient for maintaining the fluidized bed, is also obtained in the vicinity of the axis of the reactor. The fluidized-bed reactor according to the invention is particularly suitable for at least partially indirect heating, because heating devices, in particular heating pipes, can be provided in that cross-section of the fluidized bed which is substantially free of blow orifices, without excessive interference with the formation of the fluidized bed. It has been found that particularly advantageous flow conditions and a stable fluidized bed are obtained when the heating pipes dip substantially vertically from above into the interior.

Nevertheless, a sufficiently large central cross-section can be left free for the passage of relatively large pieces of starting material or non-pyrolyzable residual constituents of the starting material, if the heating pipes are mounted in a circumferential region of the interior and/or in a widened section of the interior. The reactor is then particularly suitable for pyrolyzing large pieces of starting material, in particular old tires. In order to prevent interference of the heating pipes with the feeding of the starting material, the reactor is then advantageously constructed for feeding the starting material into an upper central region of the reactor, and the heating pipes are mounted around this central region.

BRIEF DESCRIPTION OF THE DRAWINGS

The invention is explained in more detail below by reference to illustrative examples to be read in conjunction with the drawings.

FIGS. 2 to 4 are fragmentary vertical-sectional views (not to scale) of different embodiments of fluidizing-gas blow orifices.

DESCRIPTION OF THE PREFERRED EMBODIMENTS

Figure 1:
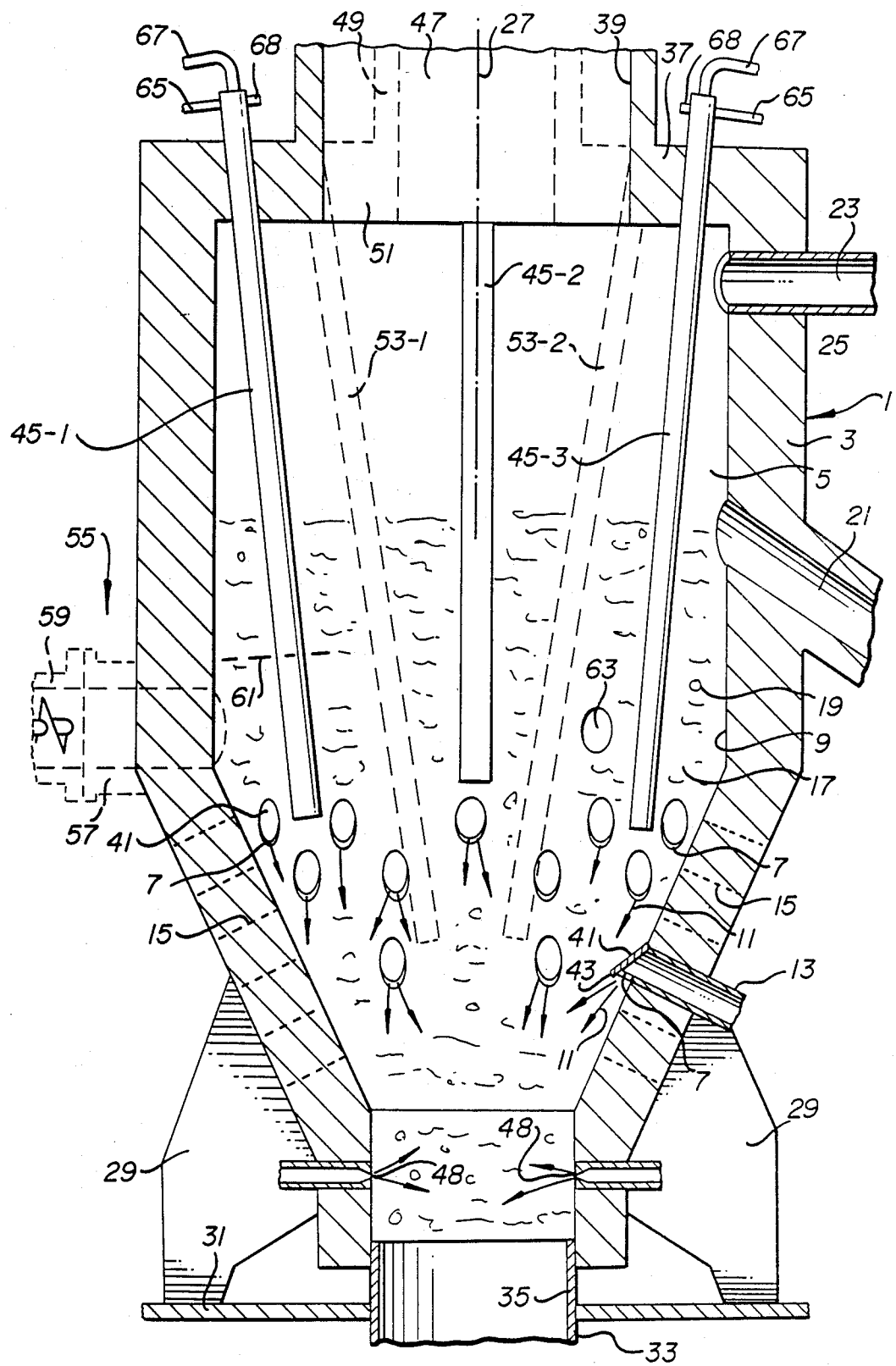
FIG. 1 is a fragmentary, diagrammatic, vertical axial-sectional view (not to scale) of a reactor according to the invention for pyrolyzing large pieces of starting material such as car tires, for example, while another embodiment which is particularly suitable for pyrolyzing small pieces of plastic wastes is indicated in broken lines.

Referring now to the figures of the drawings in detail and first, particularly, to FIG. 1 thereof, there is seen a fluidized-bed reactor with indirect heating, which is suitable for the pyrolytic treatment of old tires. The reactor includes a reactor vessel 1 with a substantially vertical circumferential wall 3 that surrounds an interior 5 which preferably has a circular cross-section. The reactor has an array of fluidizing-gas blow orifices for blowing a fluidizing gas into a fluidized-bed material. The fluidizing gas is preferably at least partially formed of pyrolysis gas produced in the pyrolysis. The fluidized-bed material is preferably sand and/or alumina. The blow orifices define a downward-pointing blowing direction and are preferably provided on the inner ends of fluidizing-gas feed pipes.

In the reactor according to the invention, several horizontal rows of blow orifices 7 are mounted close to the inner surface 9 of the circumferential wall 3. The blow orifices define obliquely downwardly and inwardly-pointing blowing directions which are indicated by arrow 11. In the embodiment shown, the blow orifices are provided on inner ends of fluidizing-gas feed pipes. For simplicity, only a single fluidizing-gas feed pipe 13 with its blow orifice 7 is shown in section in FIG. 1. The levels of the other blow orifices are indicated by dotted lines 15. A fluidized-bed 17 which forms during operation with particles 19 of the fluidized-bed material present therein, is also indicated in FIG. 1. In the uppermost region of the fluidized-bed 17 which forms during operation, the interior is connected to an overflow 21 for discharging sand and soot from the fluidized-bed. A pyrolysis gas discharge line 23 is connected to the topmost region 25 of the interior 5. The upper region of the interior 5 can also be widened in a non-illustrated manner.

In the operating position shown, with the axis 27 of the reactor substantially vertical, the reactor rests on a floor 31 through supports 29. The reactor tapers downwards and ends in a discharge branch 33 for solids, to which a discharge pipe 35 for solids is connected in the embodiment shown. The upper end of the reactor has an end wall 37. An inlet branch 39 for feeding fluidized-bed material and starting material to be pyrolyzed is provided in the center of the end wall 37. Any additives, for example lime, can also be fed through this inlet branch, for exerting a chemical influence on the reaction taking place in the fluidized bed.

In the reactor shown, the blow orifices 7 are located substantially flush on the inner surface 9 of the circumferential wall 3, so that the blow orifices provide the least possible impediment to the establishment of a uniform flow pattern. The top of the blow orifices are covered top in order to ensure a downwardly-pointing blowing direction and to prevent ingress of fluidized-bed material into the fluidizing-gas feed lines. In the embodiment shown, the blow orifices are each covered by at least one covering 41 which extends obliquely downwards and inwards. This provides the least possible impediment to the passage of material through the reactor.

The blow orifices 7 are mounted on the inner ends of fluidizing-gas feedthroughs passing through the circumferential wall 3. In principle, these feedthroughs can be formed by channels provided in the circumferential wall 3. In such a case, the parts forming the blow orifice would be provided on the inner ends of such channels. This embodiment is not shown in FIG. 1. Instead, FIG. 1 shows an embodiment in which the fluidizing-gas feedthroughs are formed by the fluidizing-gas feed pipes 13 already mentioned above. The use of separate feed pipes, which extend through appropriate bores in the circumferential wall 3, allows convenient variation of the position and geometry of the blow orifices and easy replacement in the event of wear or damage.

In the embodiment shown, the fluidizing-gas feed pipes 13 have at least a lower circumferential section 43 at the inner ends thereof that projects beyond the inner surface 9 of the circumferential wall 3. In this circumferential section 43, the fluidizing-gas feed pipes 13 have a blow orifice 7 and otherwise closed ends which form the covers 41 for the blow orifices 7. This embodiment has a very simple and inexpensive structure. In the embodiment shown, the fluidizing-gas feedthroughs formed by the fluidizing-gas feed pipes, extend obliquely upwards and inwards into the reactor, at least in the inner end sections shown which extend through the circumferential wall 3. As a result, the desired inward and downward blowing direction can conveniently be provided by an opening in a projecting lower circumferential section of the fluidizing-gas feed pipe 13. In the embodiment shown, the blow orifices are formed simply as slots extending in the circumferential direction. Such slots can be produced very simply and at low cost, even in mass production.

Blow orifice embodiments having a more involved construction are, of course, also possible and sometimes appropriate, in order to obtain the desired flow pattern with greater accuracy and/or in order to provide a desired outlet velocity of the fluidizing gas. For this purpose, downward-pointing blowing pipes can be provided, in particular in the blow orifices, and these blowing pipes can especially have a cross-sectional shape which increases the outlet velocity of the fluidizing gas. Such embodiments are not shown in FIG. 1. A high outlet velocity of the fluidizing gas can be appropriate, in order to increase the height of the fluidized bed. This can be advantageous for several reasons, such as for obtaining a screening effect, in order to separate out and discharge light particles produced during the pyrolysis, such as through the illustrated overflow 21. In the case of the pyrolysis of plastic wastes which are fed from the side into the reactor, this can be advantageous for modifying the chemical pyrolysis reaction by varying the height of the feed point relative to the total height of the fluidized bed.

As already mentioned above, heating pipes are provided in the reactor for indirect heating of the fluidized bed 17. The heating pipes 45-1, 45-2 and 45-3 dip substantially vertically from above into the interior 5 and are fixed in the upper end wall 37 of the reactor vessel 1. Such heating pipes which extend substantially vertically, cause less impediment to the fluidized bed 17 than pipes extending transversely through the reactor. Since the reactor which is shown is intended for the pyrolysis of large pieces of starting materials and therefore should have the largest free cross-section possible, the heating pipes in the embodiment shown are only provided in a circumferential region of the interior 5. Even less restriction of the free cross-section by the heating pipes is obtained if the heating pipes are disposed in a widened section of the interior. In the embodiment shown, this is accomplished when the interior 5 of the reactor vessel 1 widens conically upwards in a lower section and then continues upwards as a cylindrical section. If the heating pipes are disposed in a circumferential region of the interior as described above, it is advantageous for them to dip into circumferential regions located between blow orifices, in order to minimize interference with the blowing geometry. This is the case, for example, with heating pipes 45-1 and 45-3. If a relatively large number of heating pipes must be provided, such as in order to obtain a desired high heating performance, it is advantageous for those heating pipes which are located in circumferential regions occupied by blow orifices to end above the blow orifices in question. In FIG. 1, this is the case with the heating pipe 45-2 shown in the center.

As already described, the reactor shown is constructed for the pyrolysis of large pieces of starting material, in particular old tires. The starting material is introduced from above into an upper central region 47 of the reactor, which is formed by an inlet branch 39 already mentioned above. The heating pipes 45-1, 45-2 and 45-3 are disposed around the central region 47 and extend substantially vertically. The relatively large free cross-section of the interior 5 is adjoined at the bottom by the discharge branch 33 for solids which likewise has relatively large cross-sectional dimensions and through which relatively large pieces of non-pyrolyzable residual constituents of the starting material can be discharged downwards. In order to ensure a symmetrical outlet flow through the discharge branch 33 for solids, the discharge branch 33 is centrally disposed. In order to ensure that the solids to be discharged do not stick and that they are discharged rapidly, further blow orifices 48 are provided in the lower discharge branch 33. The further blow orifices generate a substantially radially symmetrical flow pattern and can be directed radially. In this way, the zone which is in the fluidized state can be extended downwards right into the discharge branch 33.

While using essentially the same structural features, the basic procedure described above is also possible for relatively small pieces of starting material, which only require a correspondingly smaller free cross-section for passing through the reactor. Such an embodiment is indicated in FIG. 1 in broken lines. A correspondingly smaller central inlet branch 49 is used, resulting in a larger internal section 51 of the end wall 37. Additional heating pipes 53-1, 53-2 and 53-3 can be disposed further inwards in the larger internal section 51 and can also project further into the interior 5, as shown.

With certain types of starting material, it may be desirable to feed the starting material into a central zone of the fluidized bed 17 from the side instead of from above. This is the case in particular with small pieces of plastic starting material which have a very high content of polymers, for example 90%, and therefore require a high specific pyrolysis energy. If such a starting material were fed from above into the fluidized bed, the cracked products which form, such as low-molecular olefins or the like, would mainly be taken off directly and would no longer be available for the desired formation of aromatic compounds. When such starting materials are fed into a lower region of the fluidized bed, the primary cracked products are subjected to a supply of energy for a sufficiently long time to enable them to react further with the formation of aromatic compounds. The elimination of the upper central inlet branch 49 also makes it possible to provide even more heating pipes and thus to accomplish the required high energy supply in a desirable way. It should be noted at this point that a correspondingly lower energy supply suffices for the pyrolysis of starting materials which have a lower polymer content, for example rubber and old tires, wherein the polymer content is only about 50%. This energy can be supplied solely by heating pipes which are fixed around a large central inlet branch 39 and only dip into a circumferential region of the interior 5.

In the embodiment provided for the pyrolysis of small pieces of plastic starting material indicated by broken lines in FIG. 1, a side feed device 55 can be provided for feeding the starting material into the fluidized bed 17 from the side. It is also possible to provide several side feed devices. In the embodiment indicated in broken lines, the side feed device 55 has a branch 57 which is connected to a screw conveyor 59. If there are heating pipes in the region of this side feed device 55, such as the heating pipe 45-1 in the embodiment shown, it is advantageous to have these heating pipes end above the feed device. This is indicated in FIG. 1 by the broken line 61. The side feed device 55 leads into a section of the interior 5 where the fluidized bed 17 is forming during operation and where the pyrolysis takes place. The starting material fed from the side therefore melts immediately and forms a molten drop or molten cone at the feed point which is removed rapidly by the fluidized bed which is very hot in this region. The removed molten material is very mobile and covers a large surface area of the fluidized-bed material which may be sand, so that the pyrolysis proceeds very rapidly, such as within seconds or fractions of seconds. This stage differs markedly from the stages in the pyrolysis of scrap rubber, in particular old tires. Independently of its feed point, the latter material requires a relatively prolonged action of the fluidized bed in order to be removed and pyrolyzed. The reaction then progresses relatively slowly into deeper layers, with the surface foaming up and the cohesion of the material remaining preserved for a relatively long time. Pyrolysis times of, for example, 2 minutes are therefore necessary, and there would be no noticeable advantages in directly feeding such starting materials into deeper layers of the fluidized bed. In the illustrated embodiment, yet another side charging orifice 63 is shown in order to demonstrate that some materials can, of course, also be fed at other points into the fluidized bed, for example pumpable material such as spent oil which is to be pyrolyzed.

The heating pipes 45-1, 45-2, 45-3 and 53-1, 53-2, 53-3 are preferably constructed for heating with gas, which is preferably pyrolysis gas. Accordingly, connections 65, 67, 68 for fuel gas and/or combustion air and/or exhaust gas are indicated in FIG. 1. Preferably, these are so-called radiant heating pipes, in which the fuel gas and the combustion air are highly preheated by the exhaust gas, and a high heat output per unit area at a high temperature of the pipe surface is possible.

In the embodiment shown, a fluidized bed of high load capacity is obtained inter alia because the blow orifices 7 are provided in an obliquely downwardly and inwardly-directed section of the inner surface 9 of the circumferential wall 3, so that the fluidizing gas blown out downwardly and inwardly forms a vigorous upward flow in the center of the reactor. In the embodiment shown, the inclined section is a substantially conical section of the inner surface 9, which is structurally simple.

FIG. 2 shows a configuration of a blow orifice in an illustration similar to that shown in FIG. 1, but on a larger scale and in a vertical section of a reactor side wall 203. The fluidizing-gas feed is again formed by a fluidizing-gas feed pipe 213. At least a lower circumferential section 243 of an inner end of the fluidizing-gas feed pipe 213 projects beyond an inner surface 209 of the circumferential wall 203. The feed pipe 213 has a blow orifice 207 in this circumferential section and has an otherwise closed end which forms a cover 241 for the blow orifice 207.

FIG. 3 shows a similar embodiment with a fluidizing-gas feed pipe 313 which has a lower circumferential section 343 that projects beyond an inner surface 309 of the circumferential wall 303 and a blow orifice 307 at the lower circumferential section. The feed pipe 313 provides a cover 341 for the blow orifice. In this case, however, a downwardly-pointing blowing pipe 69 is provided in the blow orifice 307. Depending on the shape and direction of the blowing pipe 69, desired flow patterns of the fluidizing gas flowing out can be obtained. Thus, the blowing pipe 69 can have a cross-sectional contour 71 which raises the outlet velocity of the fluidizing gas.

FIG. 4 shows an embodiment of the blow orifices similar to those of FIGS. 2 and 3. Here again, a vertical circumferential wall 403 is indicated. A fluidizing-gas feed pipe 413 extends obliquely upwardly and inwardly through the circumferential wall 403 and the inner end thereof is covered by a cover 441, which may be a plate welded to the pipe 413. A slot-like blow orifice 407 is provided in a lower circumferential section 443 projecting beyond an inner surface 409. Due to the inclined position of the feed pipe 413, the inner end of the pipe can lie in the plane radial to the axis 73 of the pipe, and the cover 441 can be a simple circular disk. By using different inserts of the same type as the blowing pipe 69 shown in FIG. 3, the outflow rate and outflow velocity can be adjusted independently of one another and within wide limits as desired. A similar effect can also be obtained by using restricting devices such as non-illustrated exchangeable orifice plates in the feed lines. Such separate restriction devices are more readily accessible than the blow orifices.

I claim:

1. Fluidized-bed reactor for the pyrolytic treatment of wastes containing hydrocarbons and high content of polymeric organic substances, comprising a circumferential wall (3) having an inner surface (9) and an interior (5) with a conical lower section and an expanded cylindrical upper section, a side feed device (55) for laterally feeding starting material, and a lower discharge branch (33) for discharging non-pyrolyzable large pieces of residual consitiuents, fluidizing-gas feed pipes (13) having ends with lower circumferential sections (43) protruding directly from said inner surface (9) of said circumferential wall (3) into said conical lower section, covering walls (41) covering said ends of said fluidizing-gas feed pipes (13) and extending obliquely downwardly and inwardly, blow orifices (7) each being disposed at a respective one of said lower circumferential sections (43) and having an obliquely downward and inward blow direction (11) for blowing fluidizing-gas into a fluidized-bed material (19) in said interior (5), and heating pipes (45-1, 45-2, 45-3, 53-1, 53-2) for heating with heating gas dipping vertically from above through said expanded cylindrical upper section of said interior (5), said heating pipes (45-1, 45-2, 45-3, 53-1, 53-2,) having connections (65, 67, 68) for heating gas, combustion air and exhaust gas.

2. Fluidized-bed reactor according to claim 1, wherein said fluidizing-gas feed pipes (13) extend obliquely upwardly and inwardly 3. Fluidized-bed reactor according to claim 1, wherein said blow orifices (7;207;407) are in the form of slots extending in circumferential direction.

4. Fluidized-bed reactor according to claim 1, including downwardly pointing blowing pipes (69) disposed in said blow orifices (307).

5. Fluidized-bed reactor according to claim 1, including an upper front wall (37) having a central inlet branch (39) at the center thereof, said heating pipes (45-1, 45-2, 45-3) being disposed around said central inlet branch (39)

6. Fluidized-bed reactor according to claim 1, wherein said heating pipes (45-1, 45-3) dip into circumferential regions of said interior (5) disposed between said blow orifices (7).

7. Fluidized-bed reactor according to claim 1, wherein said heating pipes (45-2) have ends disposed above said blow orifices (7) in circumferential regions of said interior (5) occupied by said blow orifices (7).

8. Fluidized-bed reactor according to claim 1, wherein said heating pipes (45-1, 45-2, 45-3, 53-1, 53-2) are distributed over the entire cross section of said interior (5);

9. Fluidized-bed reactor according to claim 1, wherein said discharge branch has further blow orifices (48) with a radial blow direction.

* * * * *